April 2, 1963 J. J. SLAVEN 3,083,687
BIRD FEEDER
Filed Sept. 13, 1961
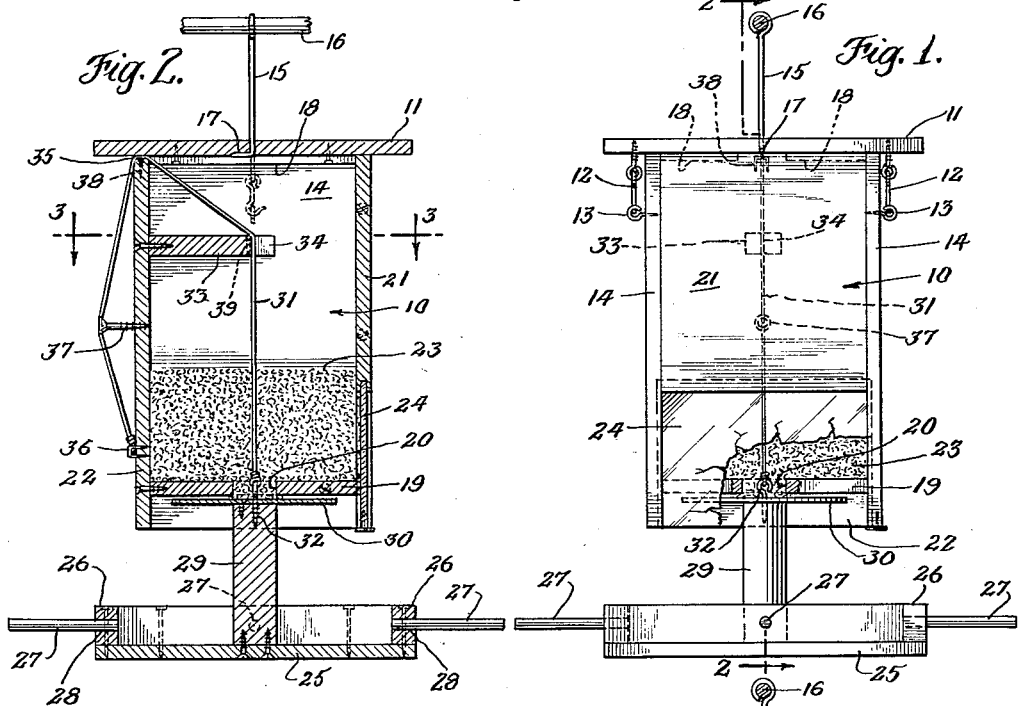
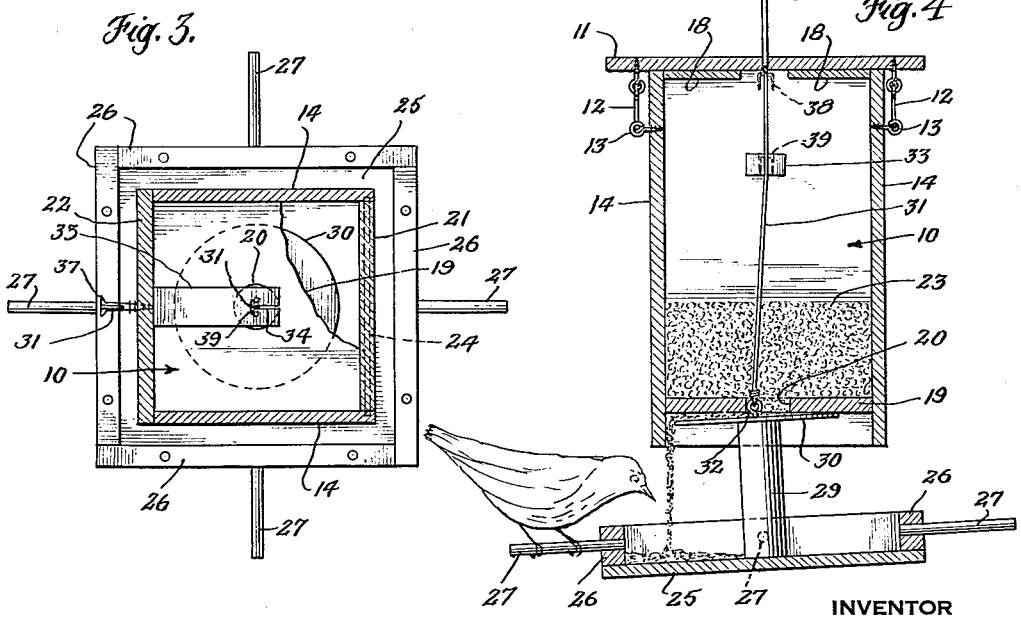
INVENTOR
John J. Slaven
BY
ATTORNEYS

United States Patent Office 3,083,687
Patented Apr. 2, 1963

3,083,687
BIRD FEEDER
John J. Slaven, 30 Locust Ave., Westmont, N.J.
Filed Sept. 13, 1961, Ser. No. 137,787
5 Claims. (Cl. 119—51)

This invention relates to a bird feeder of the gravity fed type. Such devices are intended to be hung from any convenient overhead support, such as a branch or a bracket arm on a mounting pole.

One of the primary objects of the invention is to provide an interrupted but entirely automatic feed for delivering grain, bread crumbs, or the like from the storage portion of the device, in small increments only, to a feeding tray balanced below the device. Unbalance of the tray caused by the landing of a bird upon a perch operates the intermittent feed arrangement.

Another object is to effect delivery of separate increments of feed to a locus near the periphery of the feed tray, where it is more accessible to the birds than is the case with constant feed devices which deliver the grain in the central region of the tray. One of the advantages of the intermittent feed herein contemplated is that the amount of grain delivered is normally entirely consumed by the bird at the time it is delivered. This is in contrast to other gravity fed devices, in which a supply of grain is always maintained in the center of the tray, where it is likely to become saturated by any rain which finds its way into the tray.

Among incidental advantages of the invention are simplicity of structure and operation, low cost, and dependability. A further advantage lies in the provision of a simple arrangement for adjusting the device to supply grains of different sizes.

How these and other objectives and advantages which are incident to the invention may be attained will become apparent from inspection of the description which follows, taken together with the accompanying drawings, wherein:

FIGURE 1 is a vertical elevation, partially broken away;
FIGURE 2 is a vertical section taken on the line 2—2 of FIGURE 1;
FIGURE 3 is a plan view taken on the line 3—3 of FIGURE 2; and
FIGURE 4 is a vertical section taken through the center of the device shown in FIGURE 1 and illustrating the operation of the same.

Referring now to FIGURE 1, the device consists essentially of a receptacle 10 having a removable top 11 which may be secured in place by any appropriate means. As here illustrated, the securing elements comprise hook-and-eye members 12 secured to the lid and positioned outboard of the receptacle 10. The hooks engage eyes 13 which are fastened into the walls 14 of the receptacle 10.

The device is intended to be freely suspended, and for this purpose is provided with an upstanding hook 15 configured to engage any appropriate overhead support such as a branch or the rod 16. The hook 15 passes through the lid 11, and is bent over and clinched at 17 (see FIGURE 2) in order to engage the lid 11 securely. The under face of the lid 11 may be rabbetted peripherally so as to guide the lid into its proper position with respect to the walls of the receptacle, or this guiding function may be performed, as here shown, by attaching guide plates 18 to the under side of the lid.

The receptacle 10 has a false bottom, that is, the bottom plate 19 is spaced above the lower edges of the side walls 14 and the front wall 21 and the rear wall 22. This bottom plate is centrally apertured as at 20, so as to provide a delivery chute for the bird food 23 stored within the receptacle. I have found it convenient to provide a transparent plate 24 which is set into the front wall 21 of the receptacle near the bottom of the same, so that it is easy to see when the supply of bird food in the receptacle is running low.

The feed tray is positioned directly below the bottom of the grain receptacle. It may, of course, take any one of numerous forms, but I prefer to use a base plate 25 having low peripheral walls 26. Perches 27 are provided around the periphery of the tray, these being supported in holes 28 bored through the peripheral walls 26. Four perches are here shown, but the number can, of course, be increased, so long as the positioning is such as to preserve the tray in balance.

In the central area of the base plate 25, and extending upwardly from that plate, I firmly mount a spacing stud 29, which carries a dribble plate 30 at its upper end. The dribble plate is likewise rigidly mounted to the spacing stud, so that it will move as a unit with the feed tray 25. The dribble plate 30 is of substantially greater area than the feed chute 20, but at the same time is of smaller dimension than the bottom plate 19.

The entire assembly, consisting of the feed tray, mounting stud, and dribble plate, is centrally supported in the receptacle, directly below the center of the grain chute 20, by means of a tension member 31 which is secured to the assembly, preferably by means of a screw eye 32. This tension member may be made of any flexible material. I prefer to use fairly heavy nylon cord, since it is reasonably proof against atmospheric change. The tension member passes upwardly through the grain supply to a positioning stud 33. This extends inwardly from the rear wall 22 of the device to a point beyond the center of the receptacle, and its free end is provided with a guide slot 34 which accurately positions the tension element directly at the center of the receptacle.

After passing through the guide slot 34, the tension member may be led through a small slot or nick 35, formed in the top of the rear wall 22, to a fastening staple or other securing element 36 positioned fairly well down on the rear wall 22. The locus of the feed tray may be vertically adjusted by causing the tension member 31 to pass over a spacing screw 37. The position of the spacing screw 37 may, of course, be adjusted by turning it. This affords a rather accurate control for spacing the dribble plate 30 below the bottom plate 19, thereby controlling the amount of grain which is fed to the dribble plate. It also affords means for shaking the dribble plate and feed tray in the event that particles of bird food should happen to clog the space between the dribble plate and the bottom plate.

It will be apparent that the removable cover provides an easy means for supplying additional grain to the receptacle.

When the device is suspended as shown in FIGURE 2, a small amount of grain will flow by gravity through the grain chute 20 onto the dribble plate 30, and will spread outwardly towards the periphery of the dribble plate 30 until the angle of rest is reached. With the device at rest, the flow will then stop, and the tray will be in balance underneath the receptacle. As soon as a bird lights upon one of the perches, as illustrated in FIGURE 4, the weight of the bird will cause the tray to tilt, thus tilting the dribble disk 30, and causing bird feed to slide down and off the dribble plate 30 onto the feeding tray at a point fairly close to the periphery of the tray. With the grain in this position, it is easily reached by the bird. In other devices, which provide for feeding the grain centrally to a fixed tray, it is necessary for the bird to move in below the body of the receptacle, and some birds are quite reluctant to do this.

Because the action of the dribble disk is such as to feed only a small amount of grain when the tray is unbalanced by the landing of a bird thereon, the bird is likely to eat all of the grain supplied by one tilting of the tray.

It is surprising to discover how quickly birds will learn to leave the perch when one increment of feed has been consumed and return for another bite if still hungry. They learn, in other words, to swing the tray for more food.

In any case, the grain dropping into the feeding tray is always fresh and dry and palatable. This is a marked improvement over sundry other types of bird feeders, which are built to maintain a fairly substantial quantity of grain upon the tray. In feeders of that type, the supply of grain actually present in the tray is inherently more than the bird will eat, and any rain which finds its way onto the tray will saturate the feed, thereby reducing its desirability.

This is especially important during the winter months, when ice may form on the feeding tray. With devices of the type affording a direct gravity feed to the tray, freezing of any rain which finds its way onto the surface of the tray will result in embedding the grain in a sheet of ice, which makes it difficult or impossible for the birds to remove it. In contrast, in the present device, the grain supplied is always dry, even though it may fall on top of a layer of ice covering the bottom of the feed tray.

Purely for convenience, I have shown the feeder of the present invention as being made of wood. The staples 38 and 39 are provided primarily to ensure that intermittent load upon the tension member will not cause it to work deeper into the notches 35 and 34, either splitting the wood or binding therein. It is, of course, obvious that the device might be circular, in plan, or made of other material. Even with a square plan, I find that more effective operation is secured if the dribble plate takes the form of a circular disk, for this ensures uniform distribution from the grain chute 20, which likewise is preferably circular.

When the device is first put into operation, it is placed upon a horizontal support, in which position the dribble plate completely closes the grain chute. The lid is removed and the grain is supplied to the desired level. The lid is then replaced and fastened, and the device is suspended from the support 16. In this position, the vertical distance between the bottom 19 and the dribble plate 30 is adjusted by releasing the tension member 31 from the fastening element 36 and permiting the feed tray and dribble plate to drop to a level which is appropriate for the size and nature of the feed being supplied. When the proper position has been reached, the tension element is secured to the fastening means, and the device is ready for use. As before indicated, the spacing screw 37 can be used for securing finer adjustments.

One of the advantages in providing the storage receptacle with a false bottom is that the position of the dribble plate may be lowered quite substantially, in order to handle fairly large seeds, such as sunflower seeds, without at the same time exposing the feed which flows under the dribble plate to the weather.

I claim:

1. A gravity-operated bird feeder comprising a vessel for storing grain and the like, said vessel having means for suspending it from an overhead support and a central discharge opening of substantial size in its base, a substantially planar occluding element tiltably suspended below said opening in the base, to receive and interrupt the flow of grain through said opening, a feed tray tiltable in any direction and carried from a mid-point at a predetermined distance below the storage vessel, and means interconnecting said feed tray and said occluding element to cause the latter to tilt, and thus permit limited discharge through the said opening when the former is tilted.

2. The device of claim 1 in which the occluding element is centrally supported through a flexible tension member.

3. The device of claim 2 in which a bracket arm is transversely mounted in an upper portion of the vessel, said arm being configured to provide a central point of support for said tension member.

4. A bird feeder comprising a receptacle for bird feed having an upper removable top and a lower centrally apertured bottom; a dribble plate, a feed tray, and interconnecting means rigidly maintaining the plate and tray in axial alignment but vertically spaced apart; a flexible tension member between the dribble plate and a central point in an upper portion of the receptacle, said tension member supporting the dribble plate at a locus adjacent the bottom of the receptacle but spaced therefrom a sufficient distance to permit rocking movement of the dribble plate to occur, the plate being larger than the aperture but smaller than the receptacle, and the tray being larger than the plate.

5. The device of claim 4, wherein the tension member slidably engages a transverse support at the center of the receptacle and is extended out of the receptacle to an external fastening element, whereby to permit adjustment of its length without removing the top.

References Cited in the file of this patent

UNITED STATES PATENTS

| | | |
|---|---|---|
| 516,339 | Wellsteed | Mar. 13, 1894 |
| 1,072,570 | Callahan | Sept. 9, 1913 |
| 1,815,679 | Ruth | July 21, 1931 |
| 2,888,905 | Hime | June 2, 1959 |
| 2,997,981 | Siggins | Aug. 29, 1961 |